Figure 6:
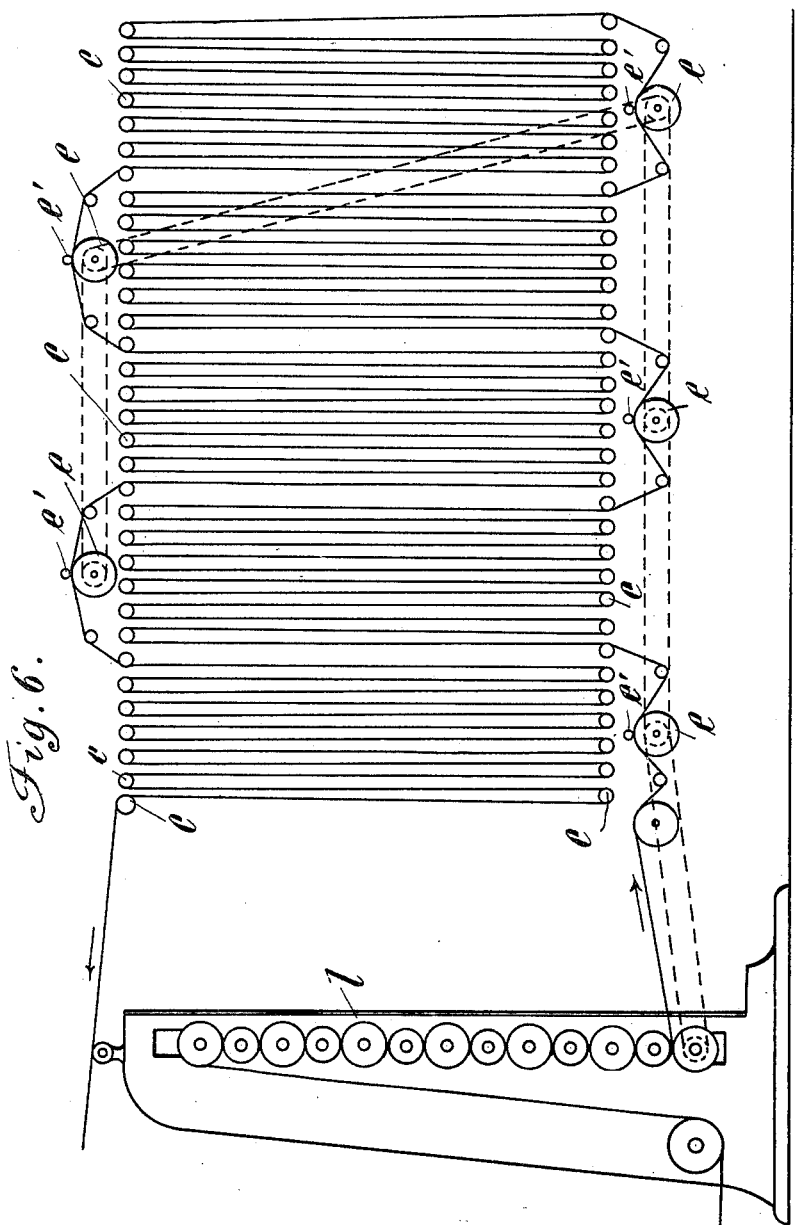

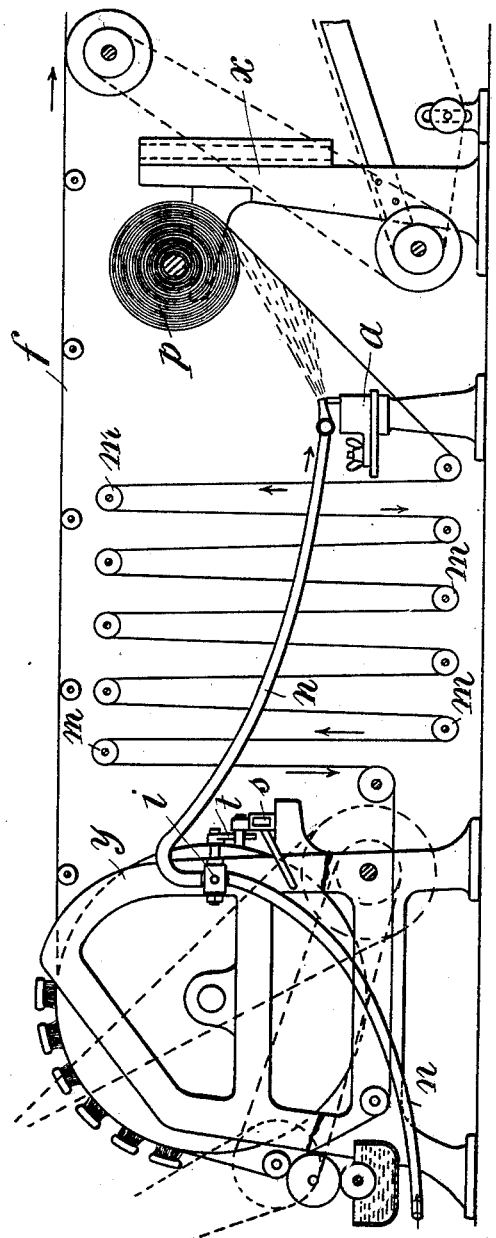

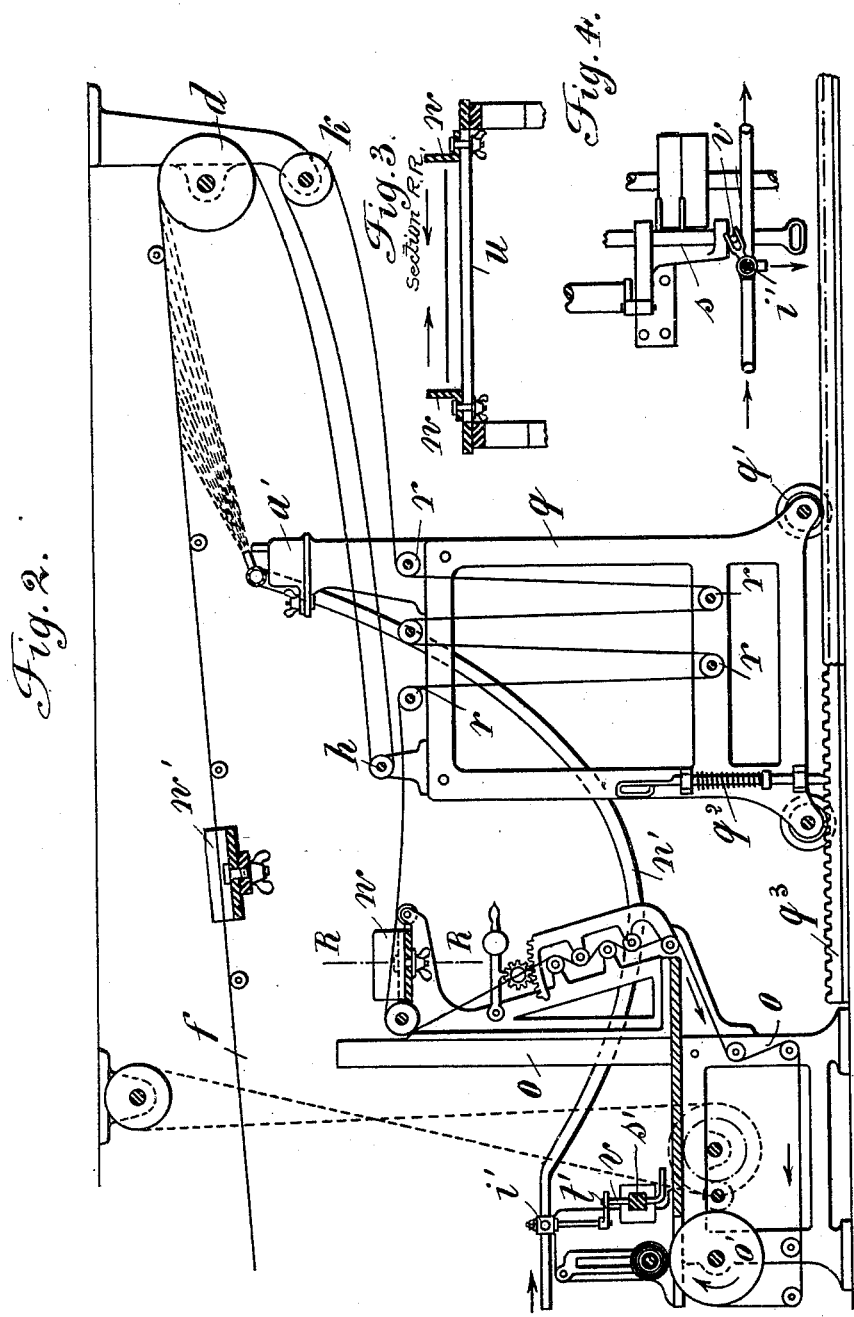

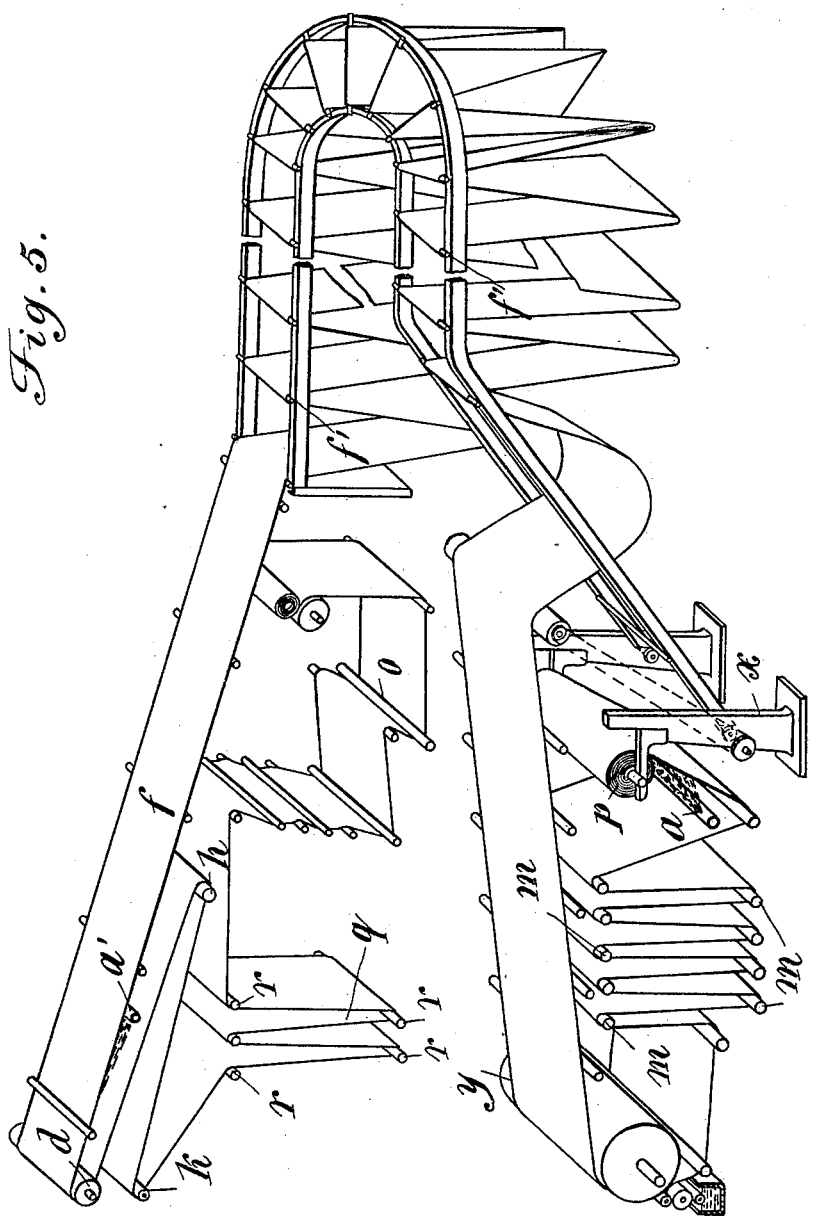

No. 697,761. Patented Apr. 15, 1902.
J. WEZEL.
PLANT FOR TREATING PAPER.
(Application filed June 19, 1901.)
(No Model.) 5 Sheets—Sheet 4.

Witnesses:

Inventor:
Julius Wezel
by Eustace W. Hopkins
atty.

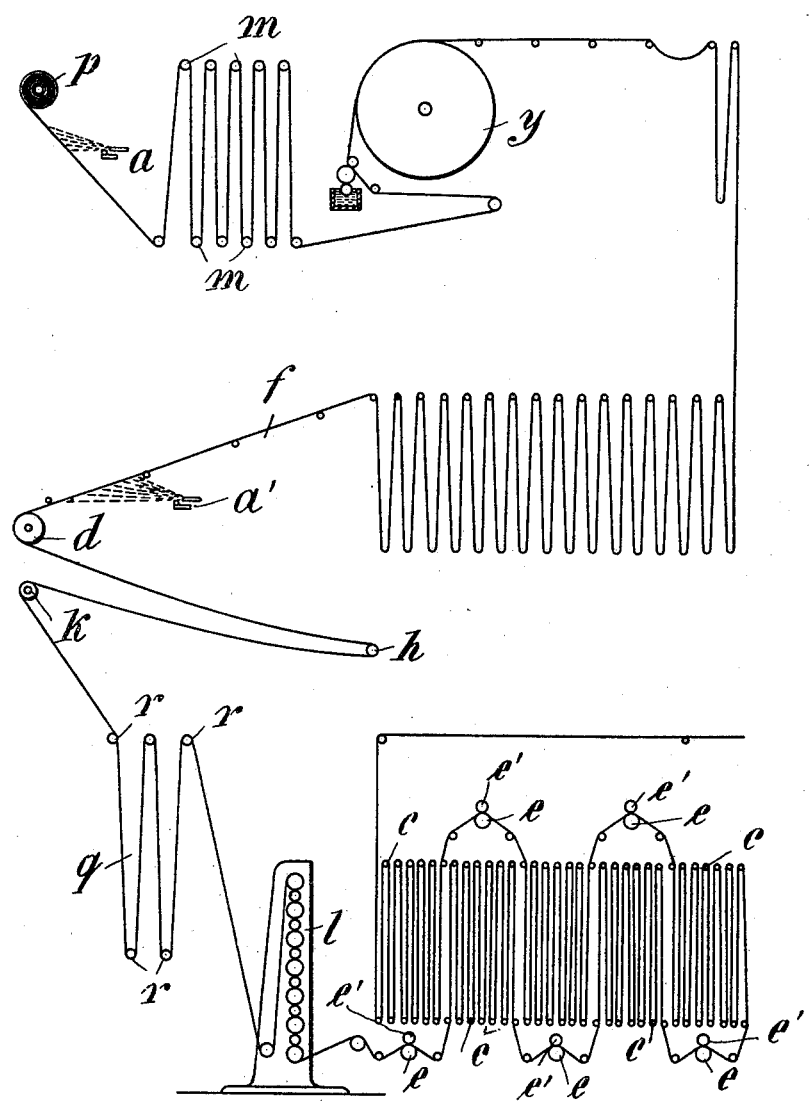

UNITED STATES PATENT OFFICE.

JULIUS WEZEL, OF LEIPSIC, GERMANY.

PLANT FOR TREATING PAPER.

SPECIFICATION forming part of Letters Patent No. 697,761, dated April 15, 1902.

Application filed June 19, 1901. Serial No. 65,178. (No model.)

*To all whom it may concern:*

Be it known that I, JULIUS WEZEL, a subject of the King of Saxony, and a resident of Leipsic, Saxony, Germany, have invented an Improved Process and Plant for Treating the Paper Used for Art-Printing, of which the following is a description.

The present invention consists of a plant for treating the paper used for art-printing. As is well known, the paper used for art-printing and known in commerce as "chromo-paper"—*i. e.*, a fine white paper provided with a very thin coating of size and a slight coating of blanc fixe—is previous to being printed upon provided with a coating or an even layer of color or tint. Hitherto this coating has been applied to the paper immediately it was unwound from the roll, and after having been dried the paper was again wound on the roll. This process has disadvantages, in that the paper is not always even and does not lie evenly on the coating-drum, so that the layer is often unevenly applied and the paper becomes patchy and unequal. In order to avoid these disadvantages, according to the present invention the paper is first moistened as it comes from the roll, then stretched by suitable stretching-rolls, then the coating is applied to the perfectly evenly stretched paper, after which the said paper is passed over a series of drying-rolls and then again moistened and stretched, calendered and dried, and stretched previous to being again wound on the roll. By this means a perfectly even coating is produced and the paper is perfectly flattened and rendered absolutely even before being rolled up onto the roll.

In order to render the present specification easily intelligible, reference is had to the accompanying drawings, in which similar letters of reference denote similar parts throughout the several views.

Figure 1 is an end elevation showing the moistening device, as also the stretching-rolls, arranged before the coating-drum. Fig. 2 is an elevation of the moistening device arranged after the coating-drum and before the rolling apparatus. Fig. 3 is a detail section on line R R of Fig. 2; Fig. 4, a detail plan view of the spray-water cock and its operating mechanism; Fig. 5, a diagram of the whole plant illustrated in Figs. 1 to 4; Fig. 6, an elevation of a calendering-machine, and Fig. 7 a diagram showing a plant including the calendering-machine.

In Figs. 1 to 4 a plant is illustrated in which the paper being coated is moistened and stretched before the coating-drum and again before it is rolled up onto the roll, the calendering operation being performed separately in this plant; but in the plant illustrated in Figs. 5 and 6 the calendering operation is included and the calendering-engine is inserted before the rolling apparatus, and a special drying device is placed after the said calendering-engine.

Referring first to Figs. 1 to 4, the paper-roll $p$ is adjustably mounted in the standards $x$ in the known manner, and the paper is passed under a series of rolls $m\,m$ to the coating-drum $y$ of the known construction. As the paper leaves the roll $p$ it is sprayed upon by an atomizer at $a$, supplied with compressed air through pipe $n$ and with water in the known manner. The rolls $m$ are not driven, so that the paper after having been moistened will have to turn them by the pull on the said paper exercised by the coating-drum $y$, and this will tend to stretch the paper perfectly evenly and cause it to lie perfectly flat on the said drum $y$. When the drum stops running, it will be necessary to turn off the compressed-air feed to the atomizer $a$, and this is done by coupling the feed-cock of the pressed-air pipe $n$ (indicated by $i$) by means of a lever connection $t$ with the stop-lever $s$ of the drum mechanism, as will be readily understood. From the drum $y$ the paper $f$ is passed along a series of drying-rolls, by which it is thoroughly dried in the known manner, Fig. 5. It is then taken over a guide-roll $d$, mounted above the winding apparatus $o$, back over a roll $h$, mounted on a frame $q$, the position of which as regards the winding apparatus may be adjusted by means of wheels $q'$ and a spring-bolt $q^2$, engaging a rack $q^3$. The frame $q$ contains a number of stretching-rolls $r$, over which the paper is stretched. This is accomplished by adjusting the position of the frame as previously described and also by utilizing a greater or less number of rolls $r$, according to the quality of the paper being treated.

Before the paper is stretched on the frame *q* it is again moistened by means of the atomizer *a'*, mounted on the frame *q*, and having pressed-air-pipe connection *n'* with cock *i''*, the lever *t'* of which is coupled by a pin-and-slot connection *v*, Figs. 2 and 4, to the stop-lever *s'* of the winding apparatus *o*, so that as soon as the latter is stopped the compressed-air feed to the atomizer *a'* will also be turned off. By means of the winding apparatus the paper thus moistened and again thoroughly stretched is wound onto the roll *o'* in the well-known manner. Before passing to the rolls *r* the paper may be first taken over a second roll *k* from *h*, said roll *k* being mounted below the roll *d*. The arrangement of the rolls is immaterial and would have to be varied in many cases according to the locality and available space. In order to guide the paper properly and to roll it evenly on the roll, a bar *u*, Figs. 2 and 3, is provided, having longitudinal slots therein in which the side gages *w* are adjustable by means of set-screws, so that the paper will be guided between the two gages *w*. Several of these guides may be provided, and a second one is shown at *w'* in Fig. 2.

Instead of taking the paper direct to the winding apparatus the calendering operation may be included in the plant. In Fig. 6 the calendering-machine (indicated at *l*) is inserted before the winding-machine, and the paper is then dried and stretched by a peculiar arrangement of loose and driven rolls, which will now be described. The top and bottom sets of rolls *c c* are loosely mounted, and the paper passes alternately over the members of a set of these rolls. It is then taken between two draw-rolls *e e'* and passed over the next set of loose rolls and then alternately passed up and down between the members of the next set but one, again between the draw-rolls *e e'*, and again leaving out a set of loose rolls onto the next set. Here the paper returns, being passed between the upper right-hand pair of draw-rolls and then around all the loose rolls of the set which were omitted previously, and so on through the upper draw-rolls, whence it is taken onto the winding apparatus. The object of the draw-rolls *e e'* is to relieve the paper of the strain of the pull which would be necessary to pull it through all the loose rolls, so that the pull will only need to be strong enough to draw the paper through one set of loose rolls, and by employing or omitting a draw-roll pair or utilizing a greater or less number of the loose rolls the tension on the paper may be readily and exactly adjusted to the particular class of paper being treated. In this modification the moistening takes place before the paper passes to the calendering-engine, as will be readily understood from Fig. 7.

The exact arrangement of the plant may be varied according to special conditions and available space, and the various apparatuses described are of the known construction and need not therefore be more particularly explained, as the individual apparatuses do not form a part of the present application.

I claim as my invention—

1. In a plant for coating paper for art-printing, the combination of means for moistening the paper and stretching the same before the coating is applied thereto, means for applying the coating and means for moistening and stretching and drying the same before it is rolled onto the roll substantially as described.

2. In a plant for coating paper for art-printing the combination of means for moistening and stretching the paper, means for applying the coating thereto, means for drying the said coating and means for again moistening and stretching the said paper previous to its being rolled up, substantially as described.

3. In a plant for coating paper for art-printing, the combination of means for moistening and stretching the paper, means for applying the coating, means for then drying the paper means for moistening it again, a calendering-engine to calender the paper after the second moistening, means for drying the paper after the calendering and for rolling the same up substantially as described.

4. In a plant of the class specified, the combination of means for moistening and stretching the paper previous to the application of the coating, means for applying the coating, and then drying the paper, means for moistening the paper again and a movable frame having a series of loose rolls mounted therein to stretch the paper and capable of adjustment to and from the rolling-up mechanism, and means for rolling up the paper in the manner and for the purpose substantially as described.

5. In a plant of the class specified, the combination, of a paper roll, an atomizer directed toward the width of the paper, a series of stretcher-rolls to receive the paper after it has passed the atomizer, means for applying the coating to the paper and for subsequently drying the same, a second atomizer to again moisten the paper after it has been dried, stretcher-rolls mounted on an adjustable frame over which the paper is passed after the second moistening and means for subsequently winding the paper to form a roll substantially as described.

6. In a plant of the class specified, the combination of means for moistening and stretching the paper, means for applying the coating and subsequently drying the paper, means for again moistening the same, a calendering-engine and means for drying the paper after the calendering operation, consisting of a series of sets of loose rolls, draw-rolls to pull the paper from one set to the next but one and draw-rolls to return the paper to the omitted sets consecutively substantially as described.

7. In a plant of the class specified, the combination of a paper-roll, an atomizer to spray the paper coming from the said roll and stretcher-rolls through which the paper is passed, a device for applying the coating to the paper and means for simultaneously stopping the said coating-machine and the atomizer, means for drying the coated paper, a second atomizer and a machine for rolling up the said paper and means for simultaneously stopping the rolling-machine and the second atomizer substantially as described.

In witness whereof I have hereunto set my hand in presence of two witnesses.

JULIUS WEZEL.

Witnesses:
RUDOLPH FRICKE,
CHAS. J. BURT.